(12) United States Patent
Lin

(10) Patent No.: US 7,482,931 B2
(45) Date of Patent: Jan. 27, 2009

(54) PRODUCT FLOW BASED AUTO-ID INFRASTRUCTURE

(75) Inventor: Tao Lin, Palo Alto, CA (US)

(73) Assignee: SAP AG, Walldorf (DE)

( * ) Notice: Subject to any disclaimer, the term of this patent is extended or adjusted under 35 U.S.C. 154(b) by 73 days.

(21) Appl. No.: 11/684,734

(22) Filed: Mar. 12, 2007

(65) Prior Publication Data

US 2007/0156545 A1 Jul. 5, 2007

Related U.S. Application Data

(63) Continuation of application No. 11/067,782, filed on Mar. 1, 2005, now Pat. No. 7,205,897.

(51) Int. Cl.
*G08B 13/14* (2006.01)

(52) U.S. Cl. ............... 340/572.1; 340/572.4; 235/375; 235/376

(58) Field of Classification Search ............ 340/572.1, 340/572.4, 539.13, 10.1, 10.42, 5.8; 235/375, 235/376, 385, 384; 382/103; 705/28, 22, 705/50, 58; 702/82
See application file for complete search history.

(56) References Cited

U.S. PATENT DOCUMENTS

| | | | |
|---|---|---|---|
| 6,456,729 B1 | 9/2002 | Moore | 382/103 |
| 6,917,291 B2* | 7/2005 | Allen | 340/572.1 |
| 7,081,818 B2 | 7/2006 | Eckstein et al. | 340/572.1 |
| 7,084,740 B2 | 8/2006 | Bridgelall | 340/10.43 |
| 7,260,553 B2* | 8/2007 | Ebert | 705/22 |
| 2005/0219051 A1 | 10/2005 | Nedblake | 340/572.1 |
| 2005/0246248 A1 | 11/2005 | Vesuna | 705/28 |
| 2006/0049249 A1 | 3/2006 | Sullivan | 235/385 |
| 2006/0208887 A1* | 9/2006 | Fields et al. | 340/572.1 |
| 2007/0001808 A1* | 1/2007 | Kastelic et al. | 340/10.1 |
| 2007/0150219 A1* | 6/2007 | Cawker et al. | 702/82 |
| 2007/0185613 A1* | 8/2007 | Feldenzer | 700/225 |

* cited by examiner

*Primary Examiner*—Toan N Pham
(74) *Attorney, Agent, or Firm*—Fish & Richardson P.C.

(57) ABSTRACT

A system includes a memory for storing a predetermined path through a plurality of data reading points in a auto-ID system, a plurality of auto-ID tracking devices operable to track an asset at the data reading points, and a processor. The processor is operable to receive data provided from the tracking devices about progress of the asset through the auto-ID system and operable to determine, based on received data indicating that the asset has passed through fewer than all of the plurality of data reading points in the predetermined path, whether or not the progress of asset through the auto-ID system has followed the predetermined path.

39 Claims, 9 Drawing Sheets

PRODUCT FLOW BASED AUTO-ID INFRASTRUCTURE

CROSS-REFERENCE TO RELATED APPLICATION

This application is a continuation of prior U.S. patent application Ser. No. 11/067,782, filed on Mar. 1, 2005, which is incorporated herein by reference.

TECHNICAL FIELD

This description relates to automatic identification and tracking of assets.

BACKGROUND

Auto-identification (auto-id) systems are used, for example, to identify or otherwise obtain information about products that are to be manufactured, bought or sold, transported, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical object, using the identifier, and thereby determine, capture, and use the information stored in a computer system with respect to the box or the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna within an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many types of auto-id system devices exist. Examples include 2D bar code scanners, smart card devices/readers, voice recognition systems, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

SUMMARY

According to one general aspect, a system includes a memory for storing a predetermined path through a plurality of data reading points in a auto-ID system, a plurality of auto-ID tracking devices operable to track an asset at the data reading points, and a processor. The processor is operable to receive data provided from the tracking devices about progress of the asset through the auto-ID system and operable to determine, based on received data indicating that the asset has passed through fewer than all of the plurality of data reading points in the predetermined path, whether or not the progress of asset through the auto-ID system has followed the predetermined path.

Implementations can include one or more of the following features. For example, The asset can be a physical object. The asset can be associated with an identifier that is identified by the tracking devices. The identifier can be an RFID tag. At least one tracking device can be operable to track a time at which the asset is identified with a data reading point within the auto-ID system.

The system can further include an auto-identification device in communication with at least one tracking device, and that is operable to receive data provided from the tracking devices about progress of the asset through the auto-ID system. The system can further include a user interface operable to receive an identifier of the asset. The system can further include an object status database operable to provide a current status or location of the asset with respect to the data reading points. The system can further include a user interface operable to receive an identifier of the asset, and an object status database operable to provide a current status or location of the asset with respect to the data reading points.

In another general aspect, a method can include defining a path through a auto-ID system at a plurality of data reading points in the auto-ID system, receiving tracking data from tracking devices associated with fewer than all of the plurality of data reading points indicating that an asset has been associated with the fewer than all of the plurality of data reading points, and determining, based on the received data, whether or not progress of the asset through the auto-ID system has followed the predetermined path.

Implementations can include one or more of the following features. For example, the asset can be a physical object. The method can further include associating the asset with an identifier that is identified by the tracking devices. The identifier can be an RFID tag.

The method can further include receiving timing data about a time at which the asset is identified with a data reading point within the asset movement and determining, based on the received tracking and timing data, whether or not progress of the asset through the auto-ID system has followed the predetermined path. The method can further include receiving status data from one or more tracking devices associated with a data reading point and determining, based on the received tracking and status data, whether or not progress of the asset through the auto-ID system has followed the predetermined path. The method can further include monitoring passages of a plurality of assets following the predetermined path though the auto-ID system with a plurality of tracking devices, generating statistical data about the passage of an asset through the auto-ID system from data about the monitored passages, and determining, based on the statistical data and the received tracking data, whether or not progress of the asset through the auto-ID system has followed the predetermined path.

The method can further include receiving timing data about a time at which the asset is identified with a data reading point within the auto-ID system, receiving status data from one or more tracking devices associated with a data reading point, monitoring passages of a plurality of assets following the predetermined path though the auto-ID system with a plurality of tracking devices, generating statistical data about the passage of an asset through the auto-ID system from data about the monitored passages, and determining, based on the timing data, the status data, the statistical data and the received tracking data, whether or not progress of the asset through the auto-ID system has followed the predetermined path.

The method can further include detecting the presence of counterfeit goods in the auto-ID system based on a determination that progress of the asset through the auto-ID system has not followed the predetermined path. The method can further include sending an alert in response to a determination that progress of the asset through the auto-ID system has not followed the predetermined path.

In a further general aspect a method of detecting non-counterfeit goods includes defining a path through a auto-ID system at a plurality of data reading points in the auto-ID system, receiving tracking data from tracking devices associated with fewer than all of the plurality of data reading points indicating that goods have been associated with the fewer than all of the plurality of data reading points, and determining, based on the received data, that the goods have followed the predetermined path through the auto-ID system and are not counterfeit goods.

The details of one or more implementations are set forth in the accompanying drawings and the description below. Other features will be apparent from the description and drawings, and from the claims.

DETAILED DESCRIPTION

Figure 1:
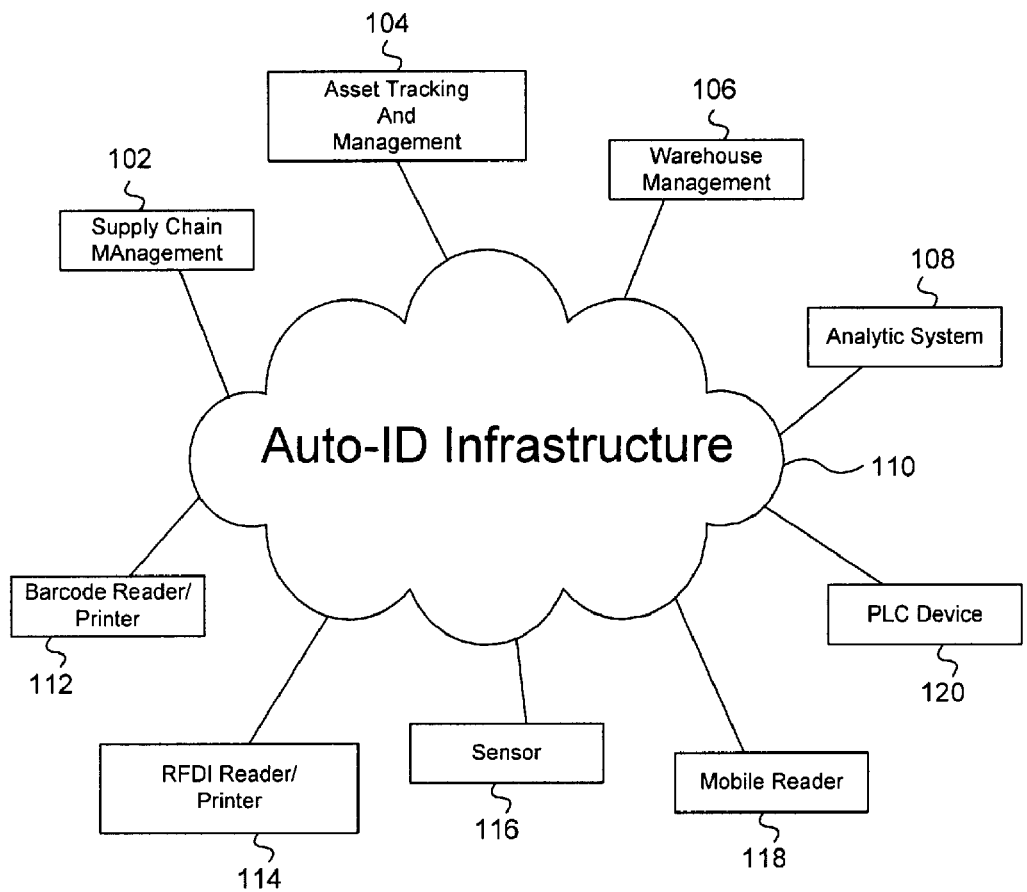
FIG. 1 is a network diagram of an auto-id system.

FIG. 1 is a network diagram of an auto-id system 100. In FIG. 1, a plurality of enterprise applications include, as examples, a supply chain management application 102, which may be used by an enterprise to oversee a process of producing/buying, shipping, or selling of the products or services of the enterprise. An asset tracking and management system 104 may be used, for example, to monitor and track a number of assets within or across a site, an organization, or across organizations, in order to determine what assets, e.g., inventory assets, are available or unavailable to, or desired by, the enterprise. A warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise.

The examples of enterprise applications illustrated in FIG. 1 illustrate the need of an enterprise to gather, share, and use data that is common to the enterprise systems. For example, the supply chain management application 102 may need to know how much of a certain type of asset is currently available, based on data within the asset management application 104. The analytic system 108 may extract data from the auto-id middleware and also from the other applications 102, 104, or 106, in order, for example, to discover performance issues (such as storage usage, reasons for delivery delay, or to validate progress of an item through a supply chain), problems (such as product counterfeit patterns), and the general visibility of the physical object (item, case, pallet). The analytic system 108 may report the discovered results through a portal system.

Much of the data to be shared and used by enterprise applications, such as, for example, those just described, relates to the products or services that are bought and/or sold by the enterprise systems. In FIG. 1, information regarding theses products or services is obtained by the applications through the use of a middleware infrastructure 110, which implements an auto-identification (auto-id) system for automatically obtaining and sharing information related to the products and services to be bought and/or sold.

Generally, auto-id systems, as referred to above, enable the automatic gathering and use of information related to products sold or used by the enterprise, and include identifiers and readers for obtaining information about the identifiers. In FIG. 1, examples of auto-id elements include a barcode reader/printer 112, which may be used to read or print barcode labels (to be) attached to an object. An RFID reader/printer 114 is shown, which, as should be understood from the above discussion of RFID systems, may be used to read information from, or assign information to, an RFID tag attached to an object. A sensor 116 may refer to, for example, an environmental sensor (e.g., a thermometer), or a voice or an optical character recognition sensor. A mobile reader 118 refers, as its name implies, to a reader that may be carried by a user for detecting, for example, an RFID tag or other auto-id identifier. Finally in FIG. 1, a Programable Logic Controller (PLC) device represents a digital controller used for applications such as on/off control, timing, logic, counting and sequencing, and also may be controlled by a device controller system, described in more detail below.

As shown in FIG. 1, then, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
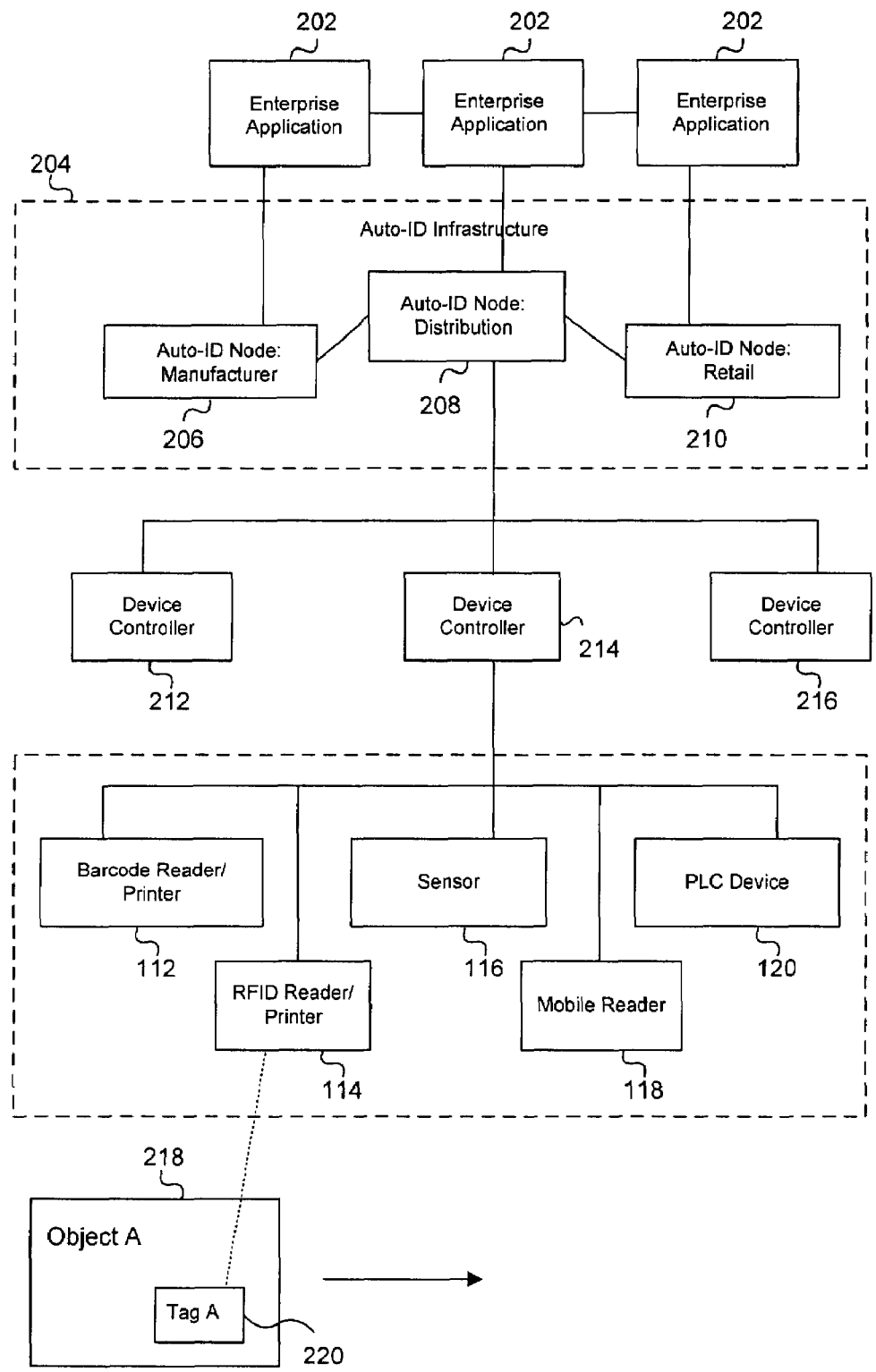
FIG. 2 is a block diagram of a system illustrating examples of the auto-id features of FIG. 1, including an auto-id infrastructure having an auto-id node(s) and a device controller(s).

FIG. 2 is a block diagram of a system 200 illustrating examples of the auto-id features of FIG. 1. In FIG. 2, enterprise applications 202 may include the various applications 102-108 discussed above, as well as various other enterprise applications.

An auto-id infrastructure 204 represents some or all of the middleware infrastructure 110 of FIG. 1. In particular, the auto-id infrastructure 204 includes auto-id nodes 206, 208, and 210. The auto-id nodes 206, 208, and 210 generally represent nodes at defined locations that are designed to associate information obtained by the auto-id devices 112-120 with existing business logic or data. Further, the auto-id nodes 206, 208, and 210 may be used to store historical information for products or objects that have been tracked by the auto-id devices/systems 112-120. Such historical information may include, for example, status information at a particular time, object location, environmental information related to the tracked object(s), and information for multiple objects that has been collected and combined for a desired purpose.

The auto-id nodes 206, 208, and 210 may be strategically placed throughout the enterprise, or across multiple enterprises. For example, one or more auto-id nodes 206 may be located at a manufacturing site, while auto-id nodes 208 may be located at a retail product distribution site, and auto-id nodes 210 may be located at a retail store. Additionally, one or ore auto-id nodes can be provided at sites of a raw materials supplier, a manufacturing plant, a manufacturing distribution center, and a transportation service. In this way, information that is particular to an actual setting of an auto-id node may be obtained and retained only at that particular node.

For example, the auto-id node 210 at a retail store may be used to track a retail price of an item, or a number of items on a shelf of the retail store. Such information may not be useful to the auto-id node 206 at a manufacturing plant location, but may be partially useful to the auto-id node 208 at the retail distribution location. For example, the auto-id node 208 at the retail distribution location may not be interested in the retail price of an item, but may be interested in a number of presently-shelved items (for purposes of re-stocking).

Similarly, business processes and business logic at the different sites may benefit from the use of the localized auto-id nodes 206, 208, and 210. For example, the retail auto-id node 210 may include a workflow for preventing theft of objects, while the manufacturing auto-id node 206 may be interested in monitoring a quantity of objects produced in a particular time period. Thus, by using a dispersed network of localized auto-id nodes, the system 200 may process information more efficiently, and in a manner that is more useful to the users at the various locations.

Each auto-id node in the system 200 generally includes one or more device controllers, illustrated in FIG. 2 as device controllers 212, 214, and 216, which are associated with the distribution auto-id node 208. Of course, each of the auto-id nodes 206, 208, and 210 may have fewer or greater numbers of device controllers, or may not use device controllers at all.

Referring to the device controller 214 as an example, FIG. 2 illustrates that the device controller 214 may be used to oversee and coordinate the operation of some or all of the auto-id devices 112-120. Of course, the device controllers 212 and 216 may be used to oversee the operations of similar auto-id devices that may be connected to those device controllers.

More specifically, the device controller 214 may be used to process data from the auto-id devices 112-120, so as to increase an efficiency of its associated auto-id node 208. For example, the device controller 214 may remove extraneous information, or may combine or modify data in a manner specified by the auto-id node 208 in a way that is useful to the distribution function of that auto-id node, and/or in a way that is useful to the enterprise applications 202.

Thus, the device controller 214 coordinates and manages the auto-id devices 112-120, perhaps based on instructions from the auto-id node 208, and relays (processed) information from the auto-id devices to the auto-id node 208. For example, the auto-id node 208 may be used to instruct the device controller 214 to obtain a particular class of data (such as, for example, quantity) with respect to an object 218 (for example, a toy or other item to be distributed to retailers for sale). Then, the device controller 214 may use the RFID reader/printer 114 to obtain this information from a tag 220 associated with the object 218, and may then remove any undesired information that is concurrently obtained before passing on the information that a certain number of the object in question is available to the auto-id node 208.

As another example, the auto-id node 208 may instruct the device controller 214 to assign information to the object 218. For example, the device controller 214 may use the RFID reader/printer 114 to change a current price of the object 218 (e.g., to store new price information on, or in association with, the RFID tag 220 attached to a certain class of object).

From FIG. 2, it should be understood that, just as each of the device controllers 212, 214, and 216 may be used to filter, aggregate, write, or otherwise manipulate data with respect to all of its associated auto-id devices and/or environment devices 112-120, the auto-id node 208 is operable to filter, aggregate, assign, or otherwise manipulate data for its associated device controllers 212, 214, and 216. In this way, the auto-id node 208 may integrate information from its device controllers 212, 214, and 216 with business processes that may be operational on one or more of the enterprise applications 202.

By extension, it may be seen that the enterprise applications 202 are operable to aggregate information from all of the auto-id nodes 216, 218, and 210. Further, it should be understood that information that is useful at one level of the system 200 may not be as useful at another level. For example, the enterprise applications 202 may not be interested in, or able to use, low-level (e.g., item-level) information that is collected by the reader/printer 114. Rather, the enterprise applications 202 may only be interested in that information to the extent that the information is filtered and/or aggregated by the device controller 214 and/or the auto-id node 208.

As a result of the described architecture, it should be understood that business logic from the enterprise application 202, and/or from multiple enterprise applications, may be supported in the auto-id middleware 110. Further, such multiple enterprise applications may be supported with a single physical hardware system and a single auto-id middleware that are common to all of the enterprise applications.

Figure 3:
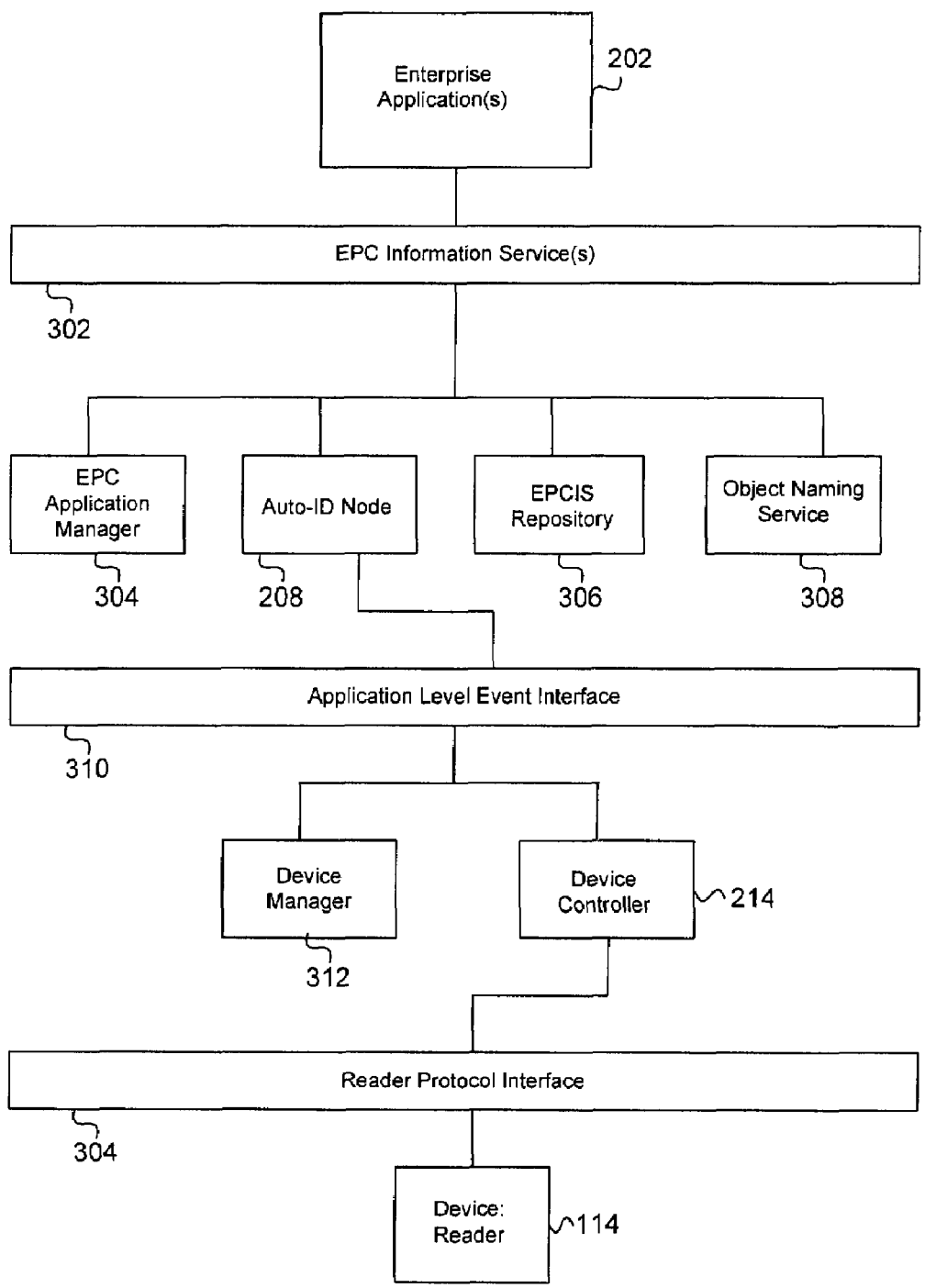
FIG. 3 is a block diagram of a network architecture for use with the auto-id infrastructure of FIG. 2.

FIG. 3 is a block diagram of a network architecture 300 for use with the auto-id infrastructure 204 of FIG. 2. More specifically, FIG. 3 illustrates an architecture by which the auto-id infrastructure 204 of FIG. 2 may be used with an Electronic Product Code (EPC) that has been developed for use with auto-id systems.

The EPC refers to a unique number, similar to a Uniform Product Code (UPC) identifier, that has a pre-defined format and scheme that multiple organizations and enterprises have agreed to use in uniquely designating and identifying their respective products, goods, services, or collections thereof (e.g., pallets, cases, or truck-loads). In the context of RFID systems, then, the EPC may be assigned to the tag 220 on the object 218 of FIG. 2. A classic EPC, for example, is defined by four fields: header field (to distinguish different formats), manufacture field (each organization that assigns the EPC has its own manufacture field), product field (product code), and serial number (with the product).

In FIG. 3, an EPC Information Services (EPCIS) layer 302 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the eXtensible Mark-up Language (XML) may be used for the above-described transfer and use of business-level EPC information The EPCIS layer 302 receives information from an application manager 304, which is generally operable to oversee information events (e.g., tag reads) and manage the events for communication to the EPCIS layer 302 and thereby to an EPCIS repository 306. The application manager 304 operates to monitor and configure the repository 306 as the repository 306 accumulates data over relatively long periods of time during which the data may not be immediately useful to any particular application or device. Generally speaking, a flow of information for a number of objects may be too great for the repository 306 to be practically useful in real-time, particularly given potential network delays. Rather, the auto-id node 208 of FIG. 2 may be used to track such information, perhaps for some fixed period of time, that may be immediately useful to the auto-id node 208.

The application manager 304 and EPCIS layer 302 have access to an Object Naming Service (ONS), which, similarly to a Domain Name Service (DNS), is a look-up service that allows the application manager 304 and EPCIS layer 302 to find information about a product, based on the EPC code for that product. The ONS 308 may have different levels of information, which may be classified, for example, by whether the information is stored locally or non-locally to the product.

An application level event (ALE) interface layer 310 provides an interface to a device manager 312 and the device controller 214. More specifically, the ALE interface layer 310 may be used to filter or aggregate information events, as received from the device manager 312 and/or the device controller 214. The device manager 312 may be used to manage a status and/or configuration of the device controller 214.

Also shown in FIG. 3, a reader protocol interface layer 314 provides an interface for the device 114. That is, it should be understood that different enterprises may employ different types of the device 114, or other auto-id devices, and these devices and enterprises may make use of different reader protocols for communicating with the readers. The reader protocol interface 314 is designed to enable communication with all readers within the system 300.

It should be understood from FIG. 3 that the system 300 may be used without the auto-id infrastructure 204 of FIG. 2, and, conversely, the auto-id infrastructure 204 of FIG. 2 may be used without other elements of FIG. 3. Thus, FIG. 3 illustrates that the auto-id infrastructure 204 of FIG. 2 may be used with, but does not require the use of, the EPC network and standard.

Figure 4:
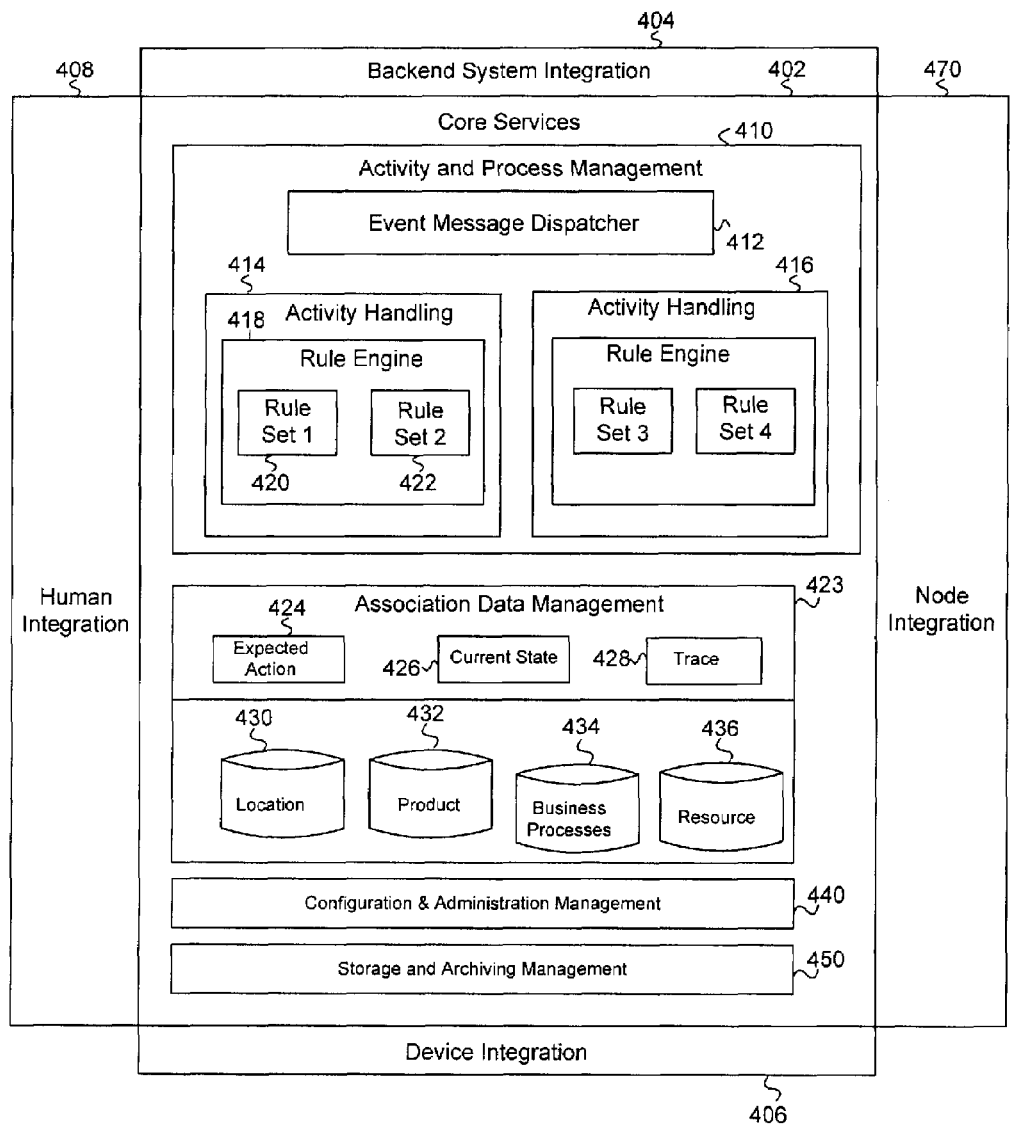
FIG. 4 is a block diagram of the auto-id node(s) of FIGS. 2 and 3.

FIG. 4 is a block diagram of the auto-id node(s) 206, 208, and 210 of FIGS. 2 and/or 3. As shown in FIG. 4, a core services module 402 handles implementation details of, for example, the auto-id node 208, as discussed in more detail below, while various integration modules 404, 406, 408, and 470 handle communication, configuration, and management details of the core services module 402 relative to external features, users, and services.

For example, the backend system integration layer 404 handles communication between the auto-id node 400 and backend systems, such as, for example, the applications 102-108 of FIG. 1, or the application 202 of FIG. 2.

The device integration layer 406 handles communication between the auto-id node 400 and devices. For example, the device integration layer 406 may enable communications between the node 208 and the device controller 214 of FIG. 2.

In some implementations the device integration layer 406 may enable communications directly with one or more of the tracking devices 112-118.

The human integration layer 408 handles communication between the auto-id node 400 and user interfaces. For example, an auto-id node operator may configure an auto-id node to perform certain tasks through a user interface, or monitor the information that the auto-id node receives. The operator also may obtain alert messages from the auto-id node in case of, for example, an unexpected event or a malfunction. Further, security of the auto-id node 400 may be monitored, so that only authorized personnel may interact with the auto-id node 400.

The node integration layer 470 handles communication between the auto-id node 400 and other auto-id nodes. For example, multiple neighboring auto-id nodes together may track an object through a distribution or supply chain, in order to provide routing information for the object, or to determine whether additional units of the object should be purchased or stocked.

The core services module 402 includes an activity and process management module 410. The activity and process management module 410 analyzes information associated with an event experienced by an object, such as, for example, a read or tracking event in which tag information is read from (for example) the tag 220 of object 218 by the RFID reader 114 in FIG. 2. Then, the activity and process management module 410 matches this information with known information that is related to the particular object.

For example, as described in more detail below, each tracked object may be associated with one or more business processes, also referred to as, for example, a business process model(s), or a workflow(s). Such processes generally describe all known or anticipated possibilities that may be experienced by an object during some or all of its lifetime, i.e., from manufacturing to distribution, or from distribution to retail sale, or from manufacturing to retail sale. In this sense, the auto-id node may require all of the lifetime information for a particular object, or may require only some sub-set of the lifetime information, depending on the duties of the particular auto-id node 400.

Thus, actual, current event information (e.g., information read from the tag 220 by the reader 114), combined with previously-detected event information, as well as anticipated event information (derived from the relevant business process model), allows the auto-id node 400 to make determinations regarding a status of the tracked object(s). In this way, the auto-id node 400 is able to identify and track an object through a supply chain, or some other business model (e.g., a customer return of merchandise), in an efficient, cost-effective manner, with minimal human intervention or supervision.

The activity and process management module 410 includes an event message dispatcher 412. The event message dispatcher 412 receives events from different sources, where, as referenced above, the term event generally may refer to an occurrence triggered by an activity of, for example, one or more of the tracking devices 112-118 of FIG. 1.

In some implementations, such events may be represented as software/data packets that are received at the event message dispatcher 412 from any number of sources. In addition to the tracking devices 112-118, an event may be received from a local operator by way of the human integration module 408. Events also may be received from, for example, the backend system 404, or from another auto-id node.

These different sources of the events may share a same or similar format in describing the various events. For example, the different sources of events may use a universal event descriptor protocol to describe the event. The event description may include, for example, a designated an object identifier, an event type (e.g., a RFID read event), an event source (e.g., the RFID reader 114), a time stamp, a location of the event source, an event subject identifier, or other information.

As one specific example, the reader device 114 may send an event of type "scanning," from a RFID reader having an id "abcd1234," associated with time "10:23 AM Dec. 21, 2004," and having an object-specific identifier that is unique to the object that was scanned. In this way, events from different sources may be received in the event message dispatcher 412 in a compatible format, so that the event message dispatcher 412 may handle the incoming events in the same or similar manner, regardless of the source(s) of events.

The event message handler 412 analyzes some or all of the information referenced above, or other information, and dispatches the incoming events to one or more activity handlers 414 or 416, accordingly. For example, an event may be dispatched to one of the other activity handlers 414/416 based on the type of the event, (e.g., a device reader event, or a neighboring auto-id node event, or a backend system event), the time of the event (e.g., whether the event is a day time event or a night time event), or virtually any other criteria by which the activity handlers may be delegated to handle the events.

The activity handler 414/416 analyzes the information about an event contained therein, along with any known data that may be associated with the event and accessed when needed, and compares this information with a determined business process(es) associated with the object of the event. In so doing, the activity handler 414/416 operates to determine one or many future actions that should be taken, if any, in response to the event.

Once determined, the future actions may be communicated outside of the auto-id node 400 for execution thereof. For example, the future actions may be communicated through the integration interfaces 404, 406, 408, and/or 470. In this way, for example, a human operator may be required to perform some action, or an alert may be raised, or a separate auto-id node 204, 206, 208 (or back-end enterprise applications 102-108/202, or device 112-120) may be notified of some required activity. The activity handler 414/416 also may update its own status and/or tracking data with respect to the object, in order to reflect the changes represented by the event(s), and to reflect more accurately where the object stands in the business process.

The business processes that are associated with the object may be represented in a set of rules, and/or as part of a workflow model that may be associated with the object, and perhaps other objects. For example, a rule may be similar to a conditional clause, stating the different actions to be taken in response to particular conditions or circumstances. That is, a rule may state that if one or more conditions is met with respect to a received event, then one or more action(s) should be taken in response. Types of conditions, decision-making processes, and responsive actions are discussed in more detail below.

To implement such rules, the activity handler 414 includes a rule engine 418 that applies rule sets 420 and 422 to the incoming events at the activity handler 414. The rule engine 418 provides an architecture for programmable rule sets to be applied to events received at the auto-id node 400. The rule engine 418 may, for example, implement a mechanism to search one or more rules in the rule sets 420/422 that may be applied to a received event.

For example, the rule engine may parse the event (that may be formatted in a universal event descriptor protocol, as referenced above), and may calculate and match the selective criteria of each rule set and/or rule to find one or many applicable rule(s). The rule engine 418 also may include a mechanism to execute a rule by activating actions on other parts of the core services 410, and/or communicating action requests on the external modules, users, and services through backend system integration 404, device integration 406, human integration 408 and Node integration 470.

As one example, the event message dispatcher 412 may determine that an incoming event is related to a received shipment of a certain class of devices at a certain location (e.g., a particular docking bay at a warehouse), and may dispatch the event to the activity handler 414, which may be assigned the handling of such events. The activity handler 414 may determine that the event is related to a certain object, and/or has other characteristics (e.g., occurred during a night-time shipment), so as to determine that the rule set 420 within the rule engine 418 is the appropriate rule set to be applied to this type of event. Then, the rule set 420 may be applied to analyze the received event and thereby match a conditional clause of each rule(s) with the information received with respect to the event, along with (possibly) other information, and, if there is a match, may apply the rule to determine the future or expected actions to be taken with respect to the event and the corresponding object.

The rule engine 418 is scalable, so that more rule sets may be added to the rule engine without disruption of its function. Moreover, the rule engine 418 is flexible, so that existing rule sets may be removed or deactivated, for example, at run time or when no longer needed.

The rule set 420 may, for example, be assigned to the activity handler 414/416 by the backend system by way of the backend system integration module 404, or from one of the other interface modules 406, 408, or 470. Rules also may be added from other auto-id nodes, or from the EPCIS repository 306 of FIG. 3, or from some other source. Since the rule sets 420/422 are modular, they may easily be replaced or modified, without disrupting operations of other rule sets.

As referenced above, the rule engine 418 receives an object-specific event and associates the event with a business process, so as to determine a future or expected action, if any, for the object associated with the event. In so doing, the rule engine 418 may have access to additional data that may be helpful in performing the matching operation. In particular, within the core services 402, an association data management module 423 communicates with the activity and process management module 410, and stores (or accesses) data and services that may be useful in the implementation of the rule sets 420 and 422 by the rule engine 418.

For example, the association data management module 424 may work closely with the activity handler 414, 416 to keep track of the life cycle of each event object, or a portion thereof, and may update the status of the event objects in real-time, in response to receiving an event. For example, the association data management module 423 may include data about the object as it progresses through its lifecycle from, e.g., a raw materials supplier to a manufacturer to a retailer, or from a return of the object until the object is re-packaged for retail sale as a refurbished object.

The association data management module 423 generally tracks two classes of data regarding a particular object(s). Specifically, dynamic data refers to data that change in time, or that may be expected to change, or that have changed as the associated object moves through time. Conversely, static refers to data that generally do not change in time, or that change only infrequently. Different parameters may be considered to by dynamic or static, depending on the object and business process(es) being tracked. For example, an object's location may be considered dynamic, while an object's color or weight may generally be considered static. However, it is possible for an object's color to change, particularly during a manufacturing process, in which case color may be considered a dynamic quality.

Thus, the dynamic data represents the object as it moves through a defined lifecycle or timeline. For example, dynamic data is generally represented in FIG. 4 as including three components: an expected action 424, a current state 426, and a history 428. The expected action 424 includes the expected future events, or possible future events, for an event. Thus, the current state 426 may include the current state of an event, and the history 428 may include a list of past events experienced by the event objects.

As these components are dynamic, the associated data may be modified in response to events that are received with respect to a particular object. For example, the three components 424, 426, 428 may be updated by the activity handler 414, 416 each time an event is received. Specifically, if an event triggers a reception of an object at a loading dock, then the object's current state may be changed from "in transit" in the current state 426 to "received." Then, the previous current state entry may be moved to the history 428, to represent the transit history of the object (e.g., a route traveled during transit). An expected action of "received" in the expected action 424 is re-designated as the current state 426, and the rule engine 414 may use the rule set 420 to determine which of the expected actions still within the expected action 424 should be implemented next (e.g., unloading the object for stocking on store shelves).

The dynamic data may thus be altered at least as often as events are received with respect to a particular object. The number and frequency of events are generally related to a number and availability of readers, so that, in the theoretical limit, an object that is continuously tracked during its lifetime by a large enough number of readers could have dynamic data that changes on a continuous basis.

In contrast, static data is stored within the association data management module 423 within databases or memory that is not generally expected to be required to update on a regular or continuous basis. Rather, the association and data management module 423 may communicate with outside sources to update the static data on a periodic or semi-periodic basis. Accordingly, such static data generally may not be expected to change in response to an event (although this may happen in some circumstances).

For example, a location database 430 may include an address of a loading dock, as well as addresses for possible sources of shipments that arrive at that loading dock. It should be understood that some location information may be considered dynamic (e.g., a current location of an object in transit), while other location information may be considered static (e.g., a manufacturing facility at which a particular object is made). In general, though, the static information will be considered not to change on an event-by-event basis.

Similarly, a product database 432 may include detailed descriptions of the products or objects that are being trackfed, including such descriptions that change, but that, again, do not generally change on an event-by-event basis. The product database 432 may store such information, or may look up the information from an outside source, using, for example, a universal product id (e.g., the EPC code read from the tag 220 of the object 218).

A business process database 434 may include one or more business processes that are associated with the object. As referenced above, a business process may refer to a formalized workflow or progression of tasks/events that is designed to govern a lifetime of an object. For example, a business process model may be formalized for a manufacturing process, or for a distribution process, or for a customer return of defective merchandise process.

In such cases, the business process model may be designed at an abstract level at, for example, the back-end system 202, to govern a lifecycle of multiple objects through an entirety (or large portions) of their respective lifecycles. Then, specific sub-sets or instantiations of the business process model(s) may be implemented or monitored at the auto-id node 400, so that the business process model for a particular object represents the lifecycle and possible (anticipated) events that the object may experience. A particular example of this type of implementation is discussed below with respect to FIG. 6.

In other examples, there may not be a business process model or workflow that is defined at this level, and the rules, the dynamic data, and the static data may implicitly define the business process that will be experienced by the object.

A resource database 436 may include other resources for the event. For example, the resource database 436 may include resources that are available for implementing whatever action is required in response to an event. For instance, if an object is received at a warehouse that requires a special device for transporting the object, then the resource database 436 may store information regarding such a moving device that may be available on the premises of the warehouse. Similar comments apply to other resources that may be useful in the management of objects throughout their lifecycle, so that, generally, whenever the rule engine 418 determines that an action is required, the resource database may be consulted to determine what resources are available for implementing that action.

Although the above implementations are discussed with respect to the division of dynamic data and static data, it should be understood that this division is merely one example. For example, the databases 430-436 may be used to store some or all of the dynamic data in addition to the static data, and, in this case, may simply be updated with the dynamically-changing data more frequently than in the above examples. For instance, to the extent that location data may represent either dynamic or static location information, as referenced above, then it should be understood that the location database 430 may be thought of as containing dynamic and/or static data.

The core services 402 also includes a configuration and administration management module 440 to configure and manage the auto-id node 400. For example, administration management module 440 may allow a user to upload more rule sets 420, 422, manage the integration logic with respect to modules 404-408, or establish connections with outside services (e.g., to update the static data storage 430-436). Finally in FIG. 4, a storage and archiving management module 450 manages the data storage and archiving of the core services module 410. For example, the module 450 may be used to archive data that is used infrequently, or that has not been used for some pre-determined time. In so doing, the module 450 may interact with an external storage site, so as to minimize resources needed at the auto-id node 400.

The above description of FIG. 4 is given with respect to the example of a timeline of a particular object or group of objects, where expected actions of the object(s) are matched with actual events. However, it should be understood that the rules, the timeline(s), and the other criteria may be implemented in terms of other parameters.

For example, rather than being object-specific, the auto-id node may operate with respect to a particular reader, or set of readers. For example, one reader may detect events from a plurality of objects' identifiers, so that the history 428, current state 426, and expected actions 424 may be defined with respect to the reader, and not with respect to any particular object read by that reader.

For instance, a Christmas display may sell many Christmas-related objects, and a reader may be located proximate to the objects to determine when the display is becoming depleted. In this example, the activity handler 414 may handle all activity that occurs with respect to the specific reader, and the rule set 420 may designate parameters for, for example, re-ordering inventory from a back room or from a manufacturer, or for replacing one type of object with another when the first type of object is sold out.

Thus, although the activity and process management module 410 may operate according to a number of different parameters and guidelines, it should be understood from the description and examples contained herein that the activity and process management 410 is operable to determine an expected or future event, and to wait until a corresponding event arrives that matches the expected event. In so doing, the activity and process management module 410 may process a number of events that do not match any expected events, in which case an alarm may be triggered, or, otherwise, no action need be taken.

Figure 5:
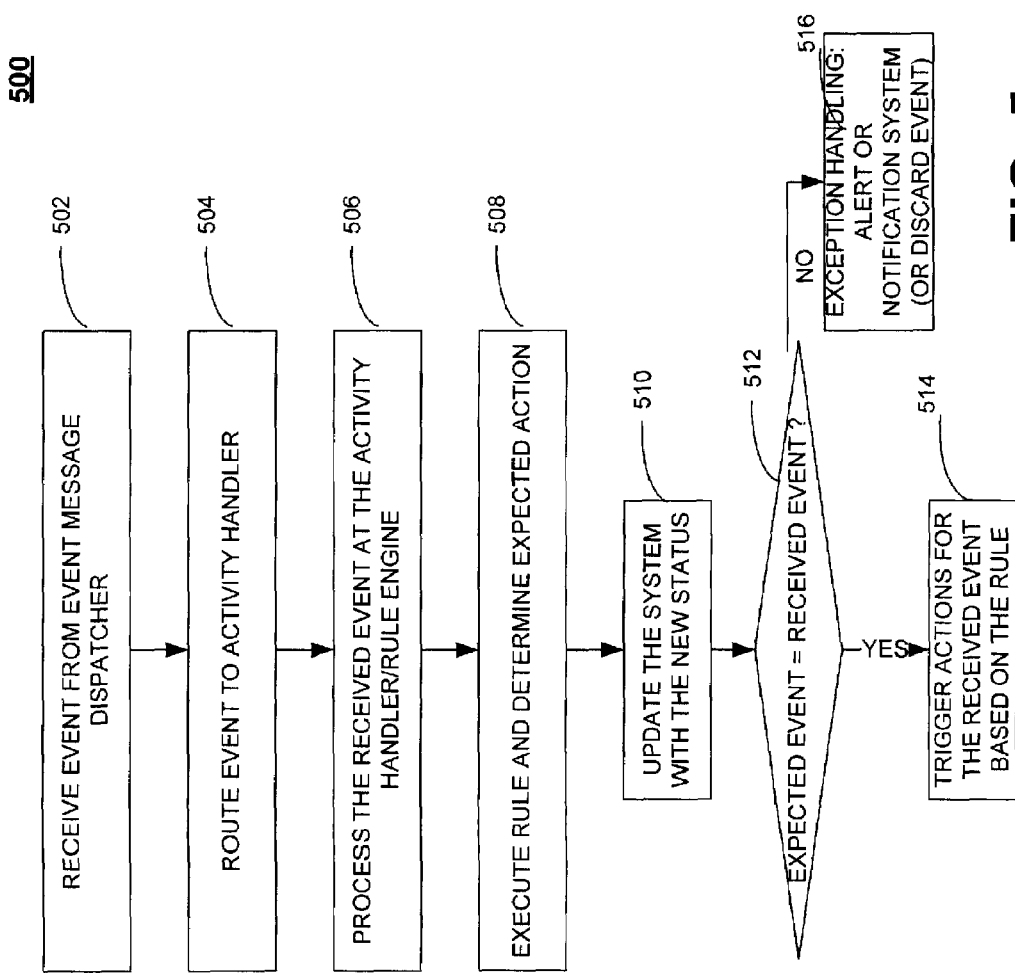
FIG. 5 is a flowchart illustrating a process of the auto-id node of FIGS. 2-4.

FIG. 5 is a flowchart illustrating a process 500 of the auto-id node of FIGS. 2-4, in which an auto-id node processes an event. In FIG. 5, initially, the event message dispatcher 412 receives an event (502) from one of the tracking devices 112-120, or from some other event-generating device. For example, a pallet of soda may arrive at a warehouse of a large retail store and be scanned by the RFID reader 114. An event is then generated that reflects an identify of the object (in this case, the pallet itself, and/or each individual can of soda) in the form of a data packet that is sent to the event message dispatcher 412.

The event message dispatcher 412 then uses information contained within, and/or associated with, the event to find an appropriate activity handler for the event (504). For example, the event message dispatcher 412 may determine that the activity handler 414 handles "receiving" types of events for pallets of soda. The event message dispatcher 412 thus passes the received event to the found activity handler.

The activity handler 414 receives the dispatched event and handles the event with the selected rules, e.g., the rule engine 418 and the rule set 420 (506). Specifically, the rule engine 418 analyzes the information of the event and the associated object so as to find, if any, appropriate rule sets that apply to the received event.

The rule engine 414 then execute the rule(s) 420 for the event, in order to determine the expected actions that should be taken in response to the received event (508). For example, continuing the above example, the rule set 420 may include rules for whether the shipment of soda is to be accepted at the specific warehouse, for stocking therein, or (if, for example, the specific warehouse is already fully stocked with soda) rejected and forwarded to another warehouse that may be short in its soda inventory. To name another example, the reception of the pallet of soda (or some other event) may trigger an end of a business process (at least for the discernable future, or as far as the particular auto-id node 400 is concerned with respect to the object).

The activity handler 414 then updates the auto-id system with the new status of the event (510). For example, a new location of the received object may be updated in both the location database 430 and the product database 432. Also, the business process status for the event may be updated in the expected action 424, current state 426 and history 428. For example, the expected action 424 may be updated with the newly calculated "expected action" from the rule engine 418, and the current state 426 may be updated with the "object received" event as the new current state, and previous state of the object (e.g., "in transit") may be put into the history 428.

The activity handler 418 then determines whether the received event may be matched with a future, expected action (512). If so, the activity handler completes handling the event/action by communicating the event to the related enterprise system, which may trigger more actions/processing in the enterprise system (514).

For example, the activity handler 414 may analyze the expected action 424 for the received object, and may then various evaluate criteria to determine whether future action should be taken, e.g., the rule set 420 may determine that: if the expected action for the object includes a stocking action, and if a location matches the received object's location, and if the current time stamp is within a valid time range of the event, and if the receiving warehouse is below expectations for a stocked quantity of soda, then the pallet of soda may be moved through the warehouse and stocked on the appropriate shelf. Of course, there may be more or less criteria than in the above example that is used to compare whether a received event may be matched with an expected action.

Furthermore, there may be one or more expected actions for the received event, in which case, for example, the activity handler 414 may loop through the list of expected actions until an expected action is found or the complete list is checked. For example, if the object is in transit to a final destination, there may be more than one possible transit locations for the shipment. Receiving the object in any one of the transit locations is qualified as a match to an expected action. As another example, the "received shipment" event may be communicated to a warehouse management system, so that the warehouse system may then update its inventory record, and, additionally or alternatively, the "received shipment" event may be communicated to the manufacture's management system, so that a status of the object may be changed to "shipped."

When the activity handler 418 fails to find an expected action that could match the received event, the activity handler may treat the received event as unexpected or an exception (516). The activity handler 414 may then, for example, send an alert to a user interface of a local operator, notifying the local operator of the unexpected action, or may trigger another exception handling system to report the unexpected action. On the other hand, if the event is also received by other activity handlers, then the activity handler 414 may determine that it is possible that the other handler(s) are responsible for processing the event(s), and may not issue an alarm.

As just described, the activity handler 414 and the rule engine 416 thus serve at least two primary and overlapping functions. First, they determine whether a received event matches an expected action, i.e., whether the event that just happened was supposed (expected) to happen. Second, if the event was supposed to happen, then the rule engine 416 determines whether any further action is supposed to take place in response to the expected action, and, if so, triggers the further action accordingly (or, alternatively, triggers an error alert).

Figure 6:
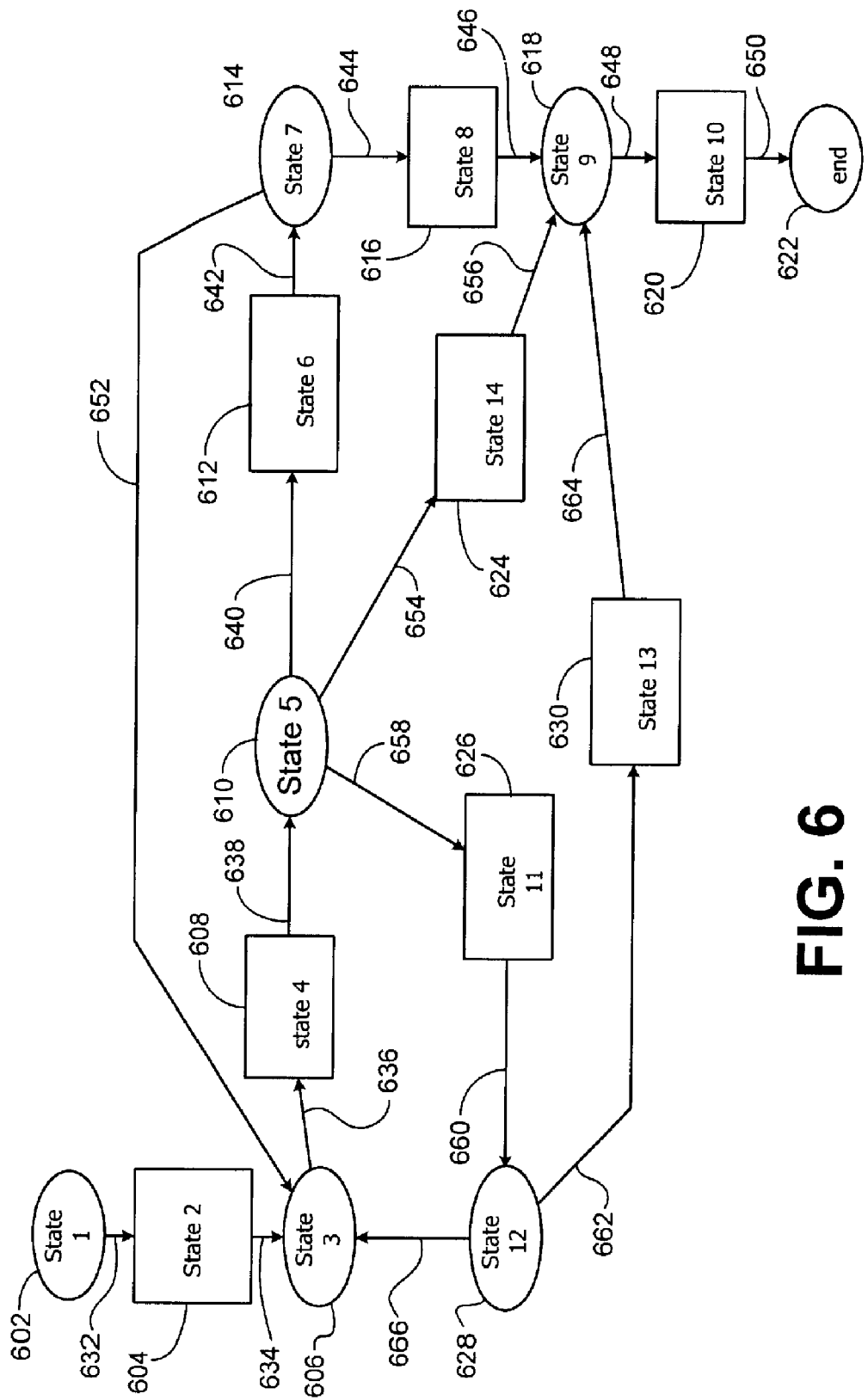
FIG. 6 is a block diagram of a business process model used in the process of FIG. 5.

FIG. 6 is a block diagram of a business process model 600 used in the process of FIG. 5 and associated with a physical object. As referenced above, the business process model 600 includes a sequence of states of an object and the event(s) that triggers any changes from one state to the next.

In FIG. 6, elements 602-630 represent a state that an object is in, or has been in at some point in the past, or may be in at some future time. More specifically, each rectangle-shaped element may represent a state that is part of a business process that is associated with the object, and/or with a lifecycle (or portion thereof) of the object. For example, "state 4" 608 may represent a state of "object in transit." Oval-shaped objects represent states for which the business process model contemplates that there may be multiple possibilities for events following therefrom, where such events are represented by multiple ones of transitional arrows 632-666 that links the various states 602-630.

As a result, FIG. 6 conceptually illustrates the features discussed above with respect to FIGS. 4 and 5, as to how the activity handlers 414/416 manage an object through multiple points along its timeline, and achieve the referenced functionality of first matching an event with an expected action, and then determining which future events should be triggered thereafter.

For example, the state 608 may represent a state of "in transit," so that the state 608 represents a current state 426 of the relevant object, and the event 638 represents an expected event of reading an RFID tag of the object at a reader located at a destination warehouse, while the state 610 represents an expected state of "at warehouse." Thus, if the activity handler 414 receives the event 638 at some point after the object has entered the state 608 "in transit," then the activity handler may use the appropriate rule engine/rule set to determine that the event 638 matches the expected action (event) of transporting the object to a specified warehouse. The rules in the rule set 620 may make such a determination based on, for example, a location of the relevant reader from which the event was generated, or a timing of the event, or an identify of the object itself.

Assuming the event matches the expected event (if not, an alarm may be triggered, or a decision to take not action may be made), then the activity handler switches a current state of the object to the state 610, and switches the state 608 to a history, or past, state. The activity handler then determines which of the possible, expected events 640, 654, and 658 should be experienced by object next.

In other implementations, an operator may determine which state 612, 624, or 626 will be experienced next, and then the activity handler may simply wait for one of the events 640, 654, or 658 to actually happen, and then select one of the states 612, 624, or 626, accordingly. In still other implementations, the operator may notify the activity handler 414 which of the states 612, 624, or 626 is to be expected, so that the activity handler 414 can determine when the corresponding event occurs.

It should be evident from FIG. 6 that there are many possible routes or timelines that a particular object may follow through the business process model 600, depending on, for example, how the rules are implemented. Further, an object's progression along a particular route may depend on its route to date, and also may depend on one or more future possible routes (states). As a result, by adding, removing, or modifying the rule sets 420 and 422, a route or lifecycle of an object may easily be managed in a number of situations and scenarios.

For example, FIG. 6 may represent a lifecycle for a package of meat or other agricultural product that is being shipped from a farm to a retail grocery store. The state 610 may represent a state of "at warehouse A," while the states of 612, 624, and 626 may represent states of "receiving facility in country A," "receiving facility in country B," and "receiving facility in country C."

The rules may be consulted to determine which of the states 612, 624, or 626 are possible, so that, for example, a corresponding event 640, 654, or 658 may be expected to be received. For example, agricultural restrictions may apply in some countries regarding limitations on importing meat or other agricultural products. As a result, if the activity handler 414 determines at the state 610 that the meat shipment originated from country Z in state 602, then this determination may apply a rule which restricts shipment into countries A and B (i.e., which limits a future action to the state 626, so that the event 658 becomes an expected event at a related auto-id node. Similar comments apply to rules which may be based on "future" states, such as a final destination state (e.g., retail grocery store) 622.

It should be understood that such rules regarding restrictions of shipments or other events/states may be dynamically modified. For example, if agricultural restrictions are lifted by an act of government of a particular country, then the rules may be modified to allow meat shipments to that country where none was previously allowed. However, in so doing, the basic architecture of the business process model and the auto-id node 400 is maintained. Similarly, more rules may be added in the business process for special handling instructions, or other additions/modification to the original business process and lifecycle of the specific product.

It should be understood that such rules may be added locally to an auto-id node, which enables the flexible adjustments of a common business rule to handle specific local business logic. This architecture may help the enterprise system, for example, to apply organization wide policies, while allowing variations at lower levels, e.g., a local auto-id level. This architecture also may help the enterprise system not to be burdened with the detailed management of the low level, local specific business process (represented in the format, for example, of rules or rule sets), even though the enterprise system may, if necessary, obtain information regarding the rule sets or other operations of the auto-id node(s). The architecture also provides an enterprise system with a scalable platform for growing the business process.

As another example of the flexibility of the architecture of the auto-id node of FIG. 4, it should be understood that the architecture allows for specific, time-limited application of desired rules, within the overall context of a business process. For example, in the example referenced above regarding a Christmas display during Christmas season, the rule set 422 may be uploaded to an auto-id node in a retail store's Christmas display that includes objects for sale.

The rule set may include a rule 422 that when the contents (objects) of the display drop below some selected amount, then additional units of the object should automatically be re-order from a particular manufacturer. After Christmas, this rule may be deactivated, or be replaced by a new rule that specifies a different inventory level to trigger a new order.

In the architecture of the activity and process management module 410, then, each removal of an object from the display may trigger an event from an associated RFID reader, and the event may be matched with an inventory activity handler, having the rule(s) associated with that reader. The rules then compare the remaining inventory with the "trigger" amount of inventory, and, when the "expected event" of less than the specified level of inventory is reached, then the activity handler triggers the order for more of the relevant object(s) of the display.

The architecture of the rule engine allows the rule updates to happen without disturbing the auto-id node from processing other events. For example, in a retail system, each promotion or sale event may be represented in a rule set, where new prices for a list of sales object may be determined from the rule(s). In a warehouse management system, seasonal objects' inventory level may be adjusted by applying different rule sets in different times of the year, or in different locations of the warehouse, depending on, for example, a local climate of the warehouse.

It should be understood that the business process model of FIG. 6 is but one representation of a framework for implementing the rules of the activity and process management module 410. Object or device states, and corresponding events, may be formalized according to some other framework, or may be implicit within the rules themselves.

Figure 7A:
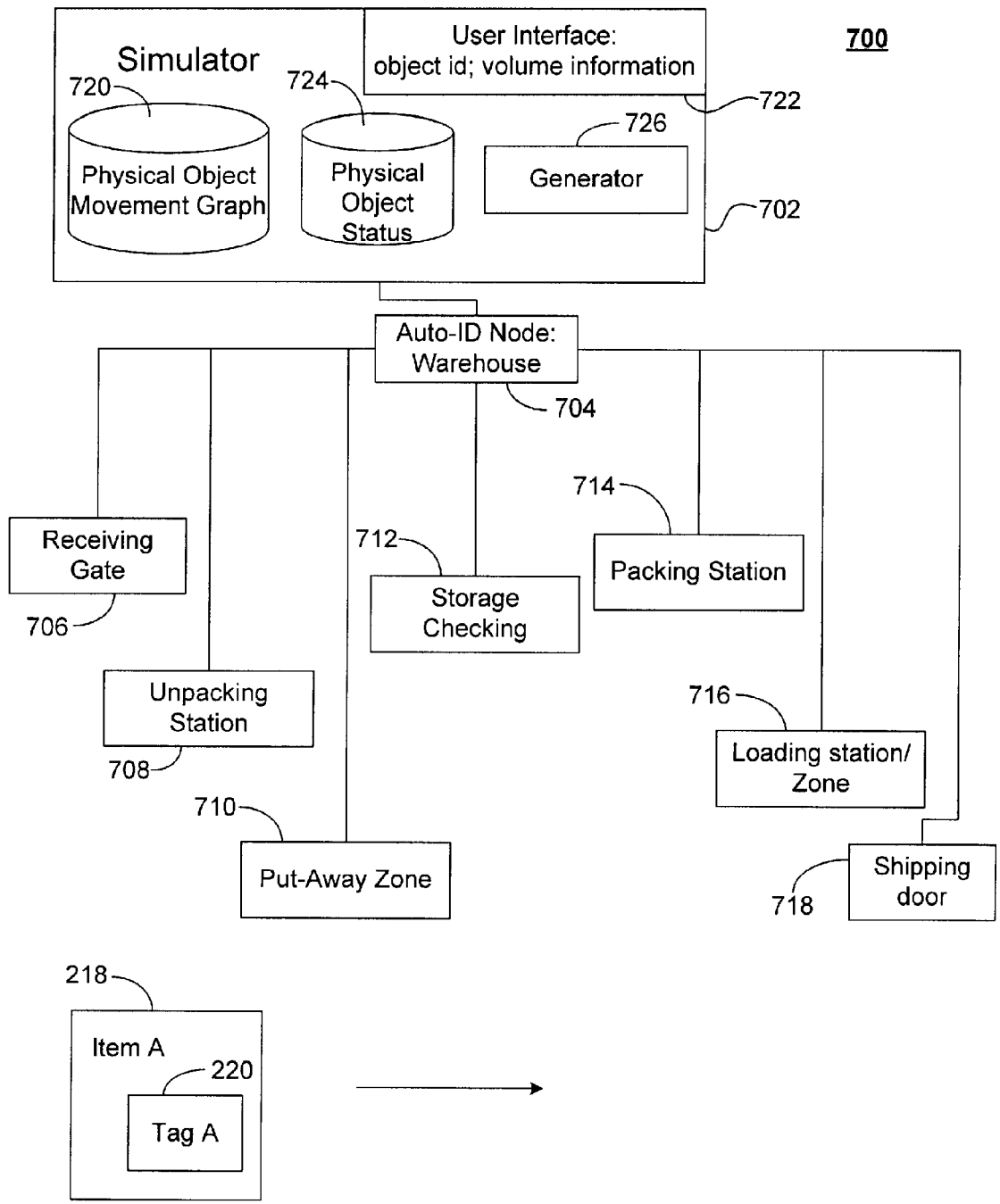
FIG. 7A is a block diagram of a tracking system used with the auto-id systems of FIGS. 1-4.

FIG. 7A is a block diagram of a auto-ID tracking system 700 used in a warehouse environment with the auto-id systems of FIGS. 1-4. In FIG. 7A, a tracker 702 is used to identify and monitor movement data corresponding to movements of one or more assets (e.g., physical objects) in a warehouse environment. More particularly, the movement data corresponds generally to movements of physical objects through a particular environment (e.g., the manufacturing, distribution, and/or retail environments of FIG. 2) associated with one or more auto-id nodes. That is, the movement data corresponds to movement of an asset, or type of asset(s), through an environment (e.g., the environment of a raw materials supplier, a manufacturer, or a retailer) that is monitored and maintained by an auto-id node 704. For example, as shown in FIG. 7A, movement corresponding to movement of an asset through a warehouse environment is monitored and maintained by the auto-id node 704.

The warehouse environment, for purposes of this example in this description, generally is intended to receive, handle, store, and/or ship physical objects, as part of, for example, a supply chain. As such, the warehouse environment generally includes a plurality of data reading points 706-718, at which information regarding a physical object is read from, for example, the RFID tag 220 that is associated with the physical object 218 of FIG. 2.

It should be understood from the above description of FIGS. 1-4 that the various data reading points 706-718 shown in FIG. 7A correspond to, and/or may include, the various device controllers and/or readers of FIGS. 1 to 2. For example, a receiving gate 706 represents a data reading point at which the object 218 is received at the warehouse. The receiving gate 706 may include one or more of the device controllers 212 to 216, and/or one or more of the readers 112-120, such as, for example, the RFID reader 114. As a result, when the object 218 is received at the receiving gate 706, information, including identification information (e.g., an SKU number), is read from the tag 220 in the matter described with respect to FIG. 4. Then, as described with respect to FIG. 4, an event message may be generated at the receiving gate 706, and transmitted to the auto-id node 704.

The object 218 may then be forwarded to one or more of a plurality of remaining data reading points, such as, for example, an unpacking station 708, a put-away zone 710 (where shipments are "put away" in their entirety, without being unpacked), a storage checking facility 712, a packing station 714, a loading station 716, and/or a shipping door 718. Discussion of the functions of the various data reading points 706-718, to the extent not apparent, is provided in more detail below in the context of discussion of the function and operation of the tracker 702.

In general, though, it should be understood that the object 218 may encounter various ones of the data reading points 706-718 as the object 218 moves through the warehouse environment. For example, the object 218 may include a pallet with two cases of retail items. The object 218 may be received at the receiving gate 706, and unpacked in part at the unpacking station 708 to separate the two cases. Then, one case may be forwarded to the loading station 716, while the other is forwarded to the packing station 714 for repacking according to a different packaging scheme (e.g., placed on another pallet with another type of retail goods), before being sent to the loading station 716. Thereafter, both cases may be sent to the shipping door 718 for shipping.

Although FIG. 7A is discussed above in terms of a single one of each of the plurality of data reading points 706-718, it should be understood that such discussion is provided for the sake of clarity and simplicity. Within an actual warehouse environment, of course, there may be many ones of the receiving gate 706, or of any one of the plurality of data reading points 706-718, or of other data reading points.

Also, a particular data reading point, such as, for example, the put-away zone 710, may be associated with a general area (and multiple tracking devices), rather than with a single reading location, such as may be more likely to occur at a particular receiving gate (of course, there may be multiple readers at a particular receiving gate, as well).

Figure 7B:
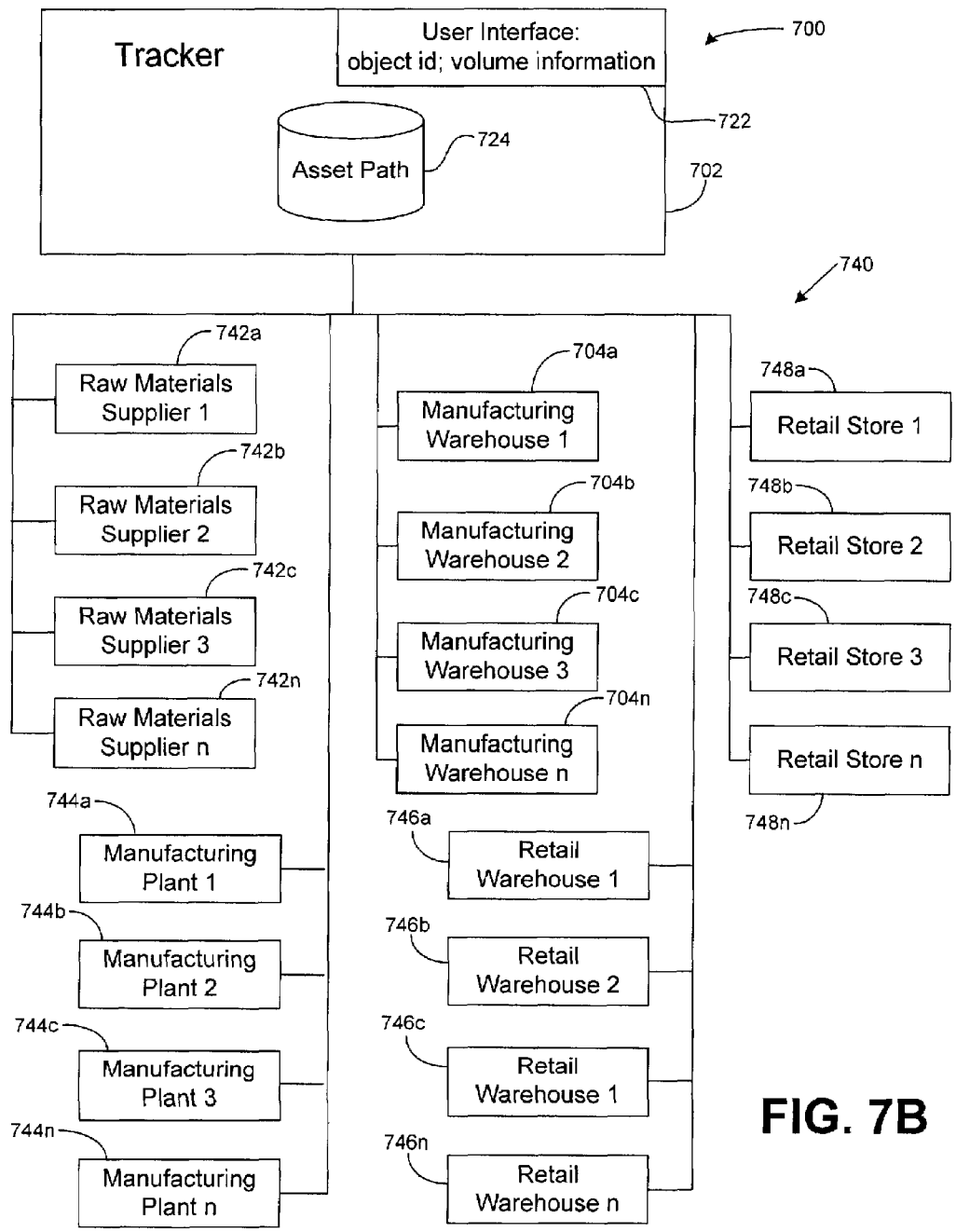
FIG. 7B is a block diagram of various environments through which a supply chain runs.

As shown in FIG. 7B, in addition to being linked to an auto-id node 704a associated with a warehouse environment, the tracker 702 of the auto-ID tracking system can be linked to multiple auto-id notes 742a-n, 744a-n, 704a-n, 746a-n, and 748a-n that are associated with different environments of a supply chain 740. In particular, the supply chain 740 can include one or more raw materials suppliers, manufacturing plants, warehouses of manufacturing distribution centers, warehouses of retail distribution centers, and retail stores, and one or more auto-id nodes can be associated with each of the environments. For example, auto-id nodes 742a, 742b, 742c, and 742n can be associated with different raw materials suppliers, different locations within the raw materials suppliers, or different processing steps at a raw materials supplier. Auto-id nodes 744a, 744b, 744c, and 744n can be associated with different manufacturing plants, different locations within the manufacturing plants, or different processing steps at a manufacturing plant. Auto-id nodes 704a, 704b, 704c, and 704n can be associated with different warehouses of a manufacturing distribution center, different locations within a warehouse (as explained above with respect to FIG. 7A), or different processing steps at a warehouse. Auto-id nodes 746a, 746b, 746c, and 746n can be associated with different distribution center warehouses of a retailer, different locations within a retailer's warehouse (as explained above with respect to FIG. 7A), or different processing steps at the retailer's warehouse. Auto-id nodes 748a, 748b, 748c, and 748n can be associated with different retailers, different locations within a retailer, or different processing steps at a retailer. Although not shown in FIG. 7B for the sake of clarity, each auto-id node 742a-n, 744a-n, 704a-n, 746a-n, and 748a-n associated with the various environments in the supply chain 740 can be connected to one or more data reading points in the supply chain 740, as is illustrated in the example shown in FIG. 7A, showing auto-id node 704 connected to data reading points 706-718.

Although the object 218 is illustrated as a single object having a single tag 220, it should be apparent from the above discussion that the object 218 also may represent a plurality of goods that may be manufactured or packaged together and/or a plurality of events that occur as an object moves through the supply chain 740. That is, as in the example just given, the object 218 may represent a pallet of goods that includes individual objects or cases, an assembly of materials, and or the completion of certain processing steps.

Various techniques for managing movements of the physical object 218 through the supply chain 740 should be apparent from the discussion of FIGS. 4-6 above. For example, a business process model such as the business model 600 of FIG. 6 may govern the movement of the physical object 218, based on, for example an origin or destination of the object 218, inventory requirements of a retail store associated with selling the object 218, or on some other business criteria or business logic.

As a result, a number of the event messages generated by the data reading points (e.g., 706-718) and received at the auto-id nodes 704 and 742-748 can be used to define a path of an object through the supply chain 740. For example, a business process model can define a path of an object 218 through a supply chain in which event messages are generated at particular data reading points (e.g., 706-718) and received by particular auto-id nodes (e.g., 742*a*, 744*c*, 704*a*, 746*b*, and 748*n*) in a particular order.

In one exemplary implementation, the business process model 600 can define a path through the supply chain 740 for a bottle of pharmaceutical pills. The path defined by the model 600 can require that raw materials are sourced from a particular raw materials supplier (e.g., 742*a*), that certain processing steps are followed by the raw materials supplier, that the pharmaceuticals are manufactured at a certain manufacturing plants (e.g., 744*c*) and that the raw materials move through particular manufacturing lines and are processed with particular techniques by the manufacturer, that the manufactured pharmaceuticals are warehoused and shipped from the manufacturing warehouse (e.g., 704*a*) following a particular routine, that the manufactured pharmaceuticals are received, stored, and shipped to a retailer by a particular retail warehouse (e.g., 746*b*) following a particular routine, and received, stored, and sold by a particular retailer (e.g., 748*n*) following particular procedures.

Movement of the object 218 through each point along the supply chain path defined by the business model 600 can be tracked and monitored by auto-id nodes 704 and 742-748. For example, as an asset (e.g., the bottle for pharmaceutical pills) moves through the supply chain, event messages reported from tracking devices 112-118 to auto-id nodes 742, 744, 704, 746, and 748 can be used to track the path of the object through the supply chain. The actual path of the asset though the supply chain can then be compared to the predetermined path defined by the business model to validate the progress of the asset through the supply chain.

A comparison of the actual path of the asset with the predetermined path can be used to manage assets in the supply chain. For example, the entrance of counterfeit goods into the supply chain 740 can be detected from a comparison of the actual path with the predetermined path, which reveals that the goods were tracked by auto-id nodes 704 and 742-748 only along a portion of the predetermined path through the supply chain 740. For example, referring to FIG. 7A, if a predetermined path of the goods through the supply chain dictates that the good must be monitored by data reading points 706-718 corresponding to a receiving gate 706, an unpacking station 708, a put-away zone 710, a storage checking 712, a packing station 714, a loading station 716, and a shipping door 718 of a warehouse of a manufacturing distribution center 704*a*, then, if only data reading points 714-718 monitor the goods but data reading points 706-712 do not monitor the goods, the tracker 702 receiving data from the auto-id node 704*a* can determine and report to an operator that unauthorized, and possibly counterfeit, goods have entered the supply chain at data reading point 714.

Furthermore, a comparison of the actual path through the supply chain 740 and the predetermined path according to a business model 600 can also be used to validate the progress of an asset though the supply chain 740 in contexts other than counterfeit goods detection. For example, because controlled substances (e.g., pharmaceuticals) may have to be manufactured and then tracked according to certain governmental or industry regulations, data from tracking devices 112-118 can be used to track and validate the progress of the substances through the supply chain, which may require, e.g., that certain environmental conditions are satisfied during the manufacturing process, that a maximum shelf life of the product or raw materials is not exceeded, and the product be maintained in particular locations during is progress through the supply chain (e.g., only in the United States).

A comparison between the actual path of an asset through the supply chain 740, as determined by data reported from the data reading points (e.g., 706-718), can be compared to a predetermined path to evaluate the progress of asset. Based on the evaluation, the asset can be verified for further progress through the supply chain 740, can be pulled from the supply chain (e.g., because the asset is determined to be a counterfeit good), can be marked for additional inquiry before being allowed to progress through the supply chain (e.g., if the asset is fresh food that must be approved by a government inspector before being allowed to progress further in the supply chain), or some other action based on the evaluation can be taken.

As described above, a comparison between the actual path though the supply chain 740 and the predetermined path must produce an exact match for the actual path to be validated as conforming to the path that is predetermined by the business model 600. However, because so many data reading points (e.g., 706-718) exist in the supply chain 740 that can include a multiplicity of auto-id nodes 704 and 742-748 associated with different environments, a large number of event messages that match the predetermined path may be required to confirm that the asset has followed the predetermined path through the supply chain 740. Thus, if a tracking device 112-118 is inoperative at the moment when it is supposed to read a tag on the asset as the asset moves through the supply chain, critical data necessary for validating a path through the supply chain 740 may be missing, which may cause an evaluation of the actual path, as determined by data reported from the data reading points (e.g., 706-718), to incorrectly conclude that the asset has not followed the predetermined path according to the business model 600. For example, referring to FIG. 7A, if the tracking device associated with packing station 714 is a mobile reader 118 that an employee uses to record that an object is packed at the packing station, is damage, loss of battery power, or misplacement of the reader 118 can result in the absence of an event message being generated at packing station data reading point 714, even though the object has moved through all the data reading points 706-718 of the warehouse environment according to a predetermined path prescribed by a business model 600.

To overcome problems associated with non-functioning or misplaced tracking devices, a comparison of an asset's path though a supply chain 704, as measured by event messages from tracking devices 112-118, can be compared to a predetermined path through the supply chain using uses rules defined in a rules set, which do not require a 100% match between all the data reading points along the predetermined path and the tracked path through the supply chain. For example, if data are received from data reading points 706, 708, 710, 712, 716, and 718 as the object moves through the warehouse environment associated with auto-id reader 704 but no data is received from the packing station data reading point 714, the rules set may determine that a match between the actual path and the predetermined path exists because event messages were received from six of the seven data reading points along the predetermined path. In addition, the rules set may require that the event messages from the data reading points are received with a particular time period and/or with a particular temporal relation to each other if one event message from the predetermined path is missing. For example, if the anticipated event message from the data reading point 714 is missing (e.g., due to damage or loss of power to the reader 118 that generates the data at the data reading point, the logic used by the tracker 702 may require that the event messages generated at loading station 716 be generated with a certain amount of time after the event message generated by the storage check 712.

Additionally, timing data can be used in combination with status data about one or more of the tracking devices 112-118 to determine that a match between the actual path and the predetermined path exists. For example, tracking devices 112-118 can send status information to the auto-id node 704 to indicate that they are on line and performing properly. Then, if an object is tracked at data reading point 712 at a first time and at data reading point 716 at a later second time but is not tracked by intermediate data reading point 714, status information from a tracking device associated with data reading point 714 indicating that the tracking device was off-line between the first time and the second time can be used to determine that the asset properly passed through data reading point 714.

Furthermore, historical data about the progress of identical or similar assets can be stored in the tracker 702 and used to validate or invalidate progress of a current asset through the supply chain. For example, when many bottles of pharmaceutical pills move through the supply chain, their progress can monitored by tracking devices 112-118 at various data reading points 706-718. Then, the progress of an individual bottle is determined to have validly passed through the supply chain 704, tracking information about the valid passage through the supply chain can be stored and used to validate the passage of future bottles. In one implementation, statistical models can be generated based on the historical data to predict the relative time at which a bottle will pass through each of the data reading points. When a later bottle moves through the supply chain 740, and an event message to verify the progress through the chain is missing, the timing information about the passage of the bottle though the data reading points in the supply chain can be compared to the historical data to validate the progress of the bottle through the supply chain. Such an analysis may be used to, for example, to detect the removal of a bottle from the supply chain and the substitution of counterfeit pills for authentic pills in the bottle, if the removal and substitution cause the bottle to move from one data reading point to a next data reading point in an amount of time that is statistically longer than past bottles.

Validation of the progress of an asset though the supply chain 740 can be performed by a rules set 420 that can be implemented in the rules engine 418 of an auto-id node 704. In particular, progress of through a supply chain or a portion of a supply chain that is monitored by a single auto-id node 704, a rules set 420 implemented in a rules engine 418, as shown in FIG. 4, can be used to monitor the progress of the asset of the supply chain and to determine whether the progress conforms to a predetermined path. However, it should be understood that the rules set 420 is scalable and, thus, that the validation processes can include event message data reported to multiple auto-id nodes 704, 742-748, which is compared to a predetermined path that spans multiple tracking devices 112-118 that report to multiple auto-id nodes. Thus, a rules set can be implemented in a rules engine that runs in the tracker 702 that receives event message data from multiple auto-id nodes.

Figure 8:
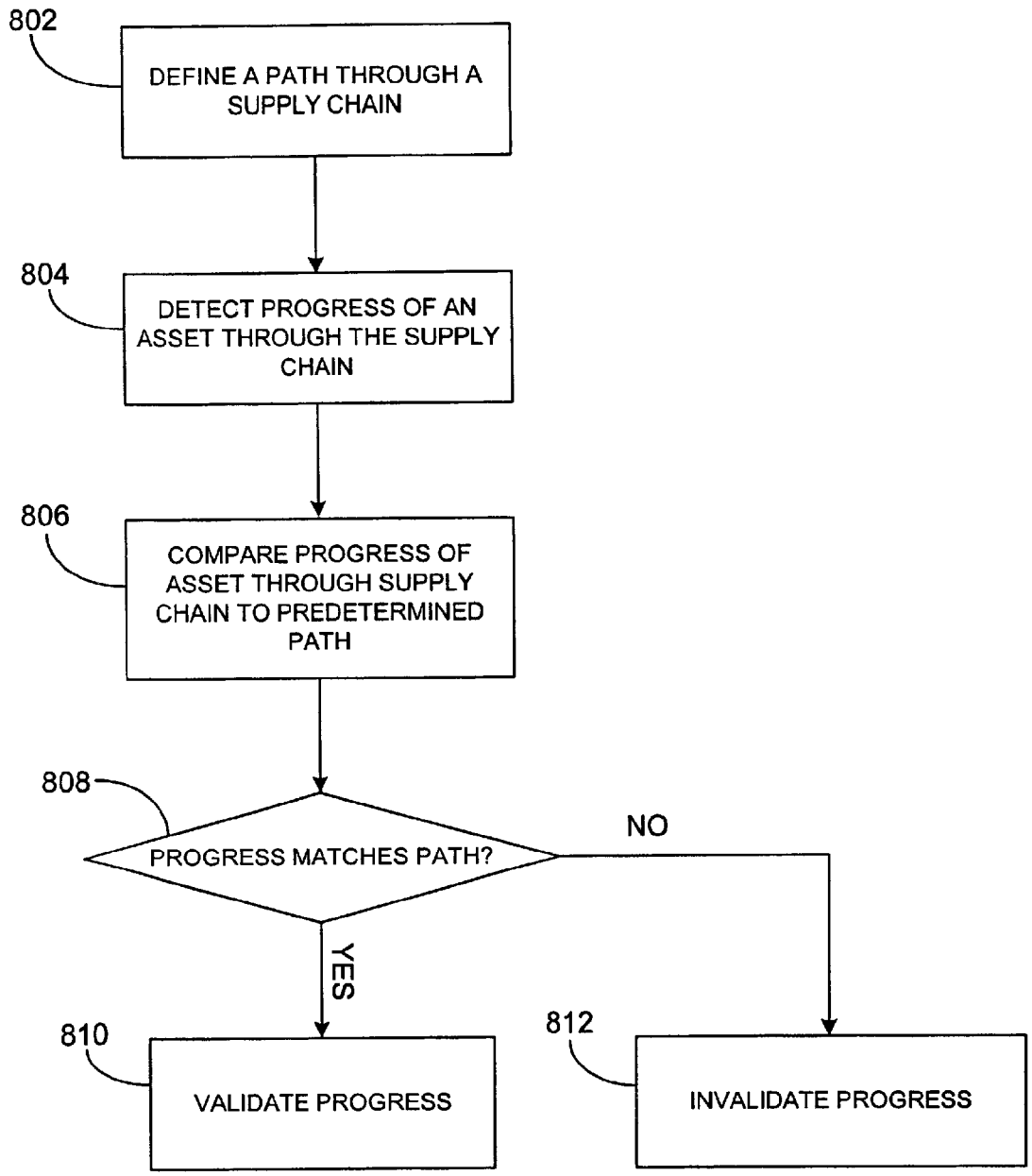
FIG. 8 is a flow chart illustrating a process for using the tracking system of FIG. 7A.

FIG. 8 is a flow chart 800 illustrating a process for using the auto-ID tracking system 700 of FIG. 7A. In FIG. 8, the process 800 begins by defining an expected path of an asset through a supply chain (802). Such path information may be entered using the user interface 722 of FIG. 7A and stored in an asset path database 724.

Then, the progress of the asset through the supply chain or through a portion of the supply chain is detected my receiving event messages from a plurality of tracking devices (804). After event message data has been gathered, the event message data are compared with the predetermined path (806), and a decision step (808) then evaluates the comparison of the event message data with the predetermined path through the supply chain to determine whether the progress of the asset through the supply chain, or through a portion of the supply chain, conforms to the predetermined path. In the comparison and decision steps a rules set is used to compare the event message data to the predetermined path information, and the rules set may include a logic that considers more than just whether each step along the predetermined path corresponds to a received event message. For example, as described above, the logic may include a tolerance of missing event message data along the path of the asset through the supply chain, an analysis of the time at which event message data were received, and a comparison to historical data for other assets that have moved through the supply chain.

If the decision step concludes that the progress of the asset through the supply chain conforms to the predetermined path, then the progress of the asset is validated (810), and if the decision step concludes that the progress does not conform to the predetermined path, then the progress of the asset can be determined to be invalid (812), and additional steps can be taken in response.

Although the examples above primarily have been given with respect to a warehousing environment, it should be understood that the tracker 702 may be used with any of the described auto-id nodes, and with other auto-id nodes, such as, for example, retail, supply chain, manufacturing, or distribution auto-id nodes.

Moreover, the tracking techniques are scaleable, and may thus take advantage of the hierarchical nature of the auto-id infrastructure 110 described above in FIGS. 1-3. For example, tracking of progress through the supply chain may be performed across multiple auto-id nodes, or across an entire enterprise application, or across entire supply chains. Further, given the hierarchical nature of many assets (e.g., individual pills, bottles of pills, bottles within a case, cases within a pallet, pallets within a shipment), tracking may be run across multiple levels, as well.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks such as internal hard disks and removable disks; magneto optical disks; and CD ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back end component, e.g., as a data server, or that includes a middleware component, e.g., an application server, or that includes a front end component, e.g., a client computer having a graphical user interface or an Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:

1. A method of tracking an object in a supply chain using an auto-ID node, comprising:
   receiving an event associated with an object from a tracking device at an event message dispatcher, the event including an event description, and the event description including an event type, a time stamp, and an event location;
   analyzing the event description at the event handler;
   transmitting the event to one of a plurality of activity handlers based upon analyzing the event description at the event handler;
   searching for a rule in a rule set of a business process workflow model to apply to the event, at a rule engine of the activity handler;
   applying the rule to the event at the rule engine;
   determining an action to be taken in response to the event at the activity handler based upon applying the rule;
   calculating a new expected action for the object based upon the event;
   updating static and dynamic data for the object based upon the event description, at an association data management module, the dynamic data including an expected action component storing the calculated new expected action for the object, a current state component storing the event description, and a history component storing data previously stored in the current state component; and
   transmitting the action for execution.

2. A method of tracking an object in a supply chain using an auto-ID node, comprising:
   receiving an event associated with an object at an event message dispatcher, the event including an event description;
   transmitting the event to an activity handler based upon the event description;
   comparing the event description to a business process workflow model at the activity handler;
   determining an action to be taken in response to the event at the activity handler based upon comparing the event description to the business process workflow;
   updating dynamic data for the object based upon the event description, at an association data management module; and
   transmitting the action for execution.

3. The method of claim 2, wherein the event is received from a tracking device, a human operator, a backend system, or an external auto-ID node.

4. The method of claim 2, wherein the event is formatted in a standardized manner.

5. The method of claim 2, wherein the event description includes an object identifier, an event type, an event source, a time stamp, an event location, an event subject identifier, and/or other event information.

6. The method of claim 2, further comprising analyzing the event at the event message handler and/or the activity handler.

7. The method of claim 2, wherein the business process workflow model describes anticipated experiences for the object during distribution of the object through a supply chain.

8. The method of claim 2, wherein transmitting the action further comprises notifying a human operator to perform the action, raising an alert, or notifying an external auto-ID node of an activity.

9. The method of claim 2, further comprising updating a status of the activity with respect to the object.

10. The method of claim 2, wherein the business process workflow model includes a set of rules associated with the object indicating different actions to be taken in response to particular conditions or circumstances.

11. The method of claim 2, wherein comparing the event description to the business process workflow model further comprises applying a rule set to the event at a rule engine of the activity handler.

12. The method of claim 11, further comprising adding, deactivating or removing a rule set at the rule engine.

13. The method of claim 11, wherein comparing the event description to the business process workflow model further comprises searching for a rule in the rule set to apply to the event.

14. The method of claim 13, wherein the rule is a time-limited rule.

15. The method of claim 13, the rule dictates that the object is to be shipped if a quantity drops below a selected amount, wherein the selected amount changes based upon a date.

16. The method of claim 2, wherein comparing the event description to the business process workflow model further comprises:
parsing the event;
calculating selective criteria of a rule or rule set, thereby determining an applicable rule.

17. The method of claim 2, wherein comparing the event description to the business process workflow model further comprises executing a rule by activating the action and/or communicating an action request.

18. The method of claim 2, further comprising updating static data for the object at the association data management module.

19. The method of claim 18, wherein the static data is updated periodically or semi-periodically.

20. The method of claim 18, further comprising communicating with a location database, a product database, a business process database, or a resource database, wherein the static data is updated based upon the communication.

21. The method of claim 18, wherein the static data includes data that does not change in time, or that infrequently changes in time.

22. The method of claim 18, wherein the static data includes object color or weight data.

23. The method of claim 2, wherein the dynamic data includes data about the object as it progresses through a supply chain.

24. The method of claim 2, wherein the dynamic data includes data that changes in time, that is expected to change in time, or that has changed as the object moves through time.

25. The method of claim 2, wherein the dynamic data includes location data or object color data.

26. The method of claim 2, wherein the dynamic data includes an expected action component, a current state component, and a history component, wherein the expected action component includes anticipated future events for the object, the current state component includes the current state of the event for the object, and the history component includes a list of past events experienced by the object.

27. The method of claim 26, wherein the anticipated future event is an acceptance event, a rejection event, a rerouting event, or an end-of-business-process event.

28. The method of claim 26, further comprising calculating a new expected action using the rule engine, wherein updating dynamic data for the object further comprises updating the expected action component with the calculated new expected action, updating the current state component based upon the event description, and updating the history component with data previously stored in the current state component.

29. The method of claim 26, wherein the anticipated future event is a 'in transit' event, a 'received shipment' event, a 'shipped' event, or an 'at warehouse' event.

30. The method of claim 26, wherein, if the list of past events does not include an event received at the previous auto-ID node, the action is a status request of a previous auto-ID node in a predetermined path.

31. The method of claim 2, further comprising configuring the auto-ID node using a configuration and administration module.

32. The method of claim 2, further comprising archiving the event.

33. The method of claim 2, further comprising determining that the activity handler is appropriate based upon the event description.

34. The method of claim 2, further comprising outputting an exception if the activity handler fails to determine an action to be taken in response to the event.

35. The method of claim 2, wherein determining an action to be taken in response to the event further comprises determining, based upon the event indicating that the object has passed through fewer than all of a plurality of auto-ID nodes in a predetermined path, whether or not the progress of the asset has followed the predetermined path.

36. The method of claim 2, wherein comparing the event description to a business process workflow model further comprises comparing a path of the object to a predetermined path.

37. The method of claim 2, wherein the action is a report that an unauthorized object has entered a supply chain, or that an object has been marked for additional inquiry.

38. An auto-ID node for tracking an object in a supply chain, the auto-ID node comprising:
an event message dispatcher configured to:
receive an event associated with an object, the event including an event description, and
transmit the event based upon the event description;
an activity handler configured to:
receive the event from the event message dispatcher,
compare the event description to a business process workflow model handler,
determine an action to be taken in response to the event based upon comparing the event description to the business process workflow, and
transmit the action for execution; and
an association data management module configured to update dynamic data for the object based upon the event description.

39. A computer program product tangibly embodied in a machine-readable storage medium, the computer program product for tracking an object in a supply chain using an auto-ID node, wherein the computer program product comprises instructions that, when read by a machine, operate to cause data processing apparatus to:
receive an event associated with an object at an event message dispatcher, the event including an event description;
transmit the event to an activity handler based upon the event description;
compare the event description to a business process work flow model at the activity handler;
determine an action to be taken in response to the event at the activity handler based upon comparing the event description to the business process workflow;
update dynamic data for the object based upon the event description, at an association data management module; and
transmit the action for execution.

* * * * *